(12) United States Patent
Ha et al.

(10) Patent No.: US 8,693,777 B2
(45) Date of Patent: *Apr. 8, 2014

(54) APPARATUS AND METHOD FOR ESTIMATING EDGE AREAS OF DIGITAL IMAGE

(75) Inventors: Joo Young Ha, Gyunggi-do (KR); Won Tae Choi, Gyunggi-do (KR); Byung Hyun Kim, Busan (KR); Bong Soon Kang, Busan (KR); Won Woo Jang, Busan (KR); Kyung Rin Kim, Gyunggi-do (KR); Jung Joo Yang, Busan (KR); Gi Dong Lee, Busan (KR); Kang Joo Kim, Gyunggi-do (KR)

(73) Assignees: Samsung Electro-Mechanics Co., Ltd., Gyunggi-Do (KR); Dong-A University Research Foundation for Industry-Academy Cooperation, Busan (KR)

( * ) Notice: Subject to any disclaimer, the term of this patent is extended or adjusted under 35 U.S.C. 154(b) by 414 days.

This patent is subject to a terminal disclaimer.

(21) Appl. No.: 13/091,227

(22) Filed: Apr. 21, 2011

(65) Prior Publication Data

US 2012/0033884 A1 Feb. 9, 2012

(30) Foreign Application Priority Data

Aug. 6, 2010 (KR) ........................ 10-2010-0076114

(51) Int. Cl.
*G06K 9/00* (2006.01)

(52) U.S. Cl.
USPC ........... 382/168; 382/254; 382/260; 382/263; 348/E9.042; 348/E9.053; 348/234

(58) Field of Classification Search
USPC .................. 382/254, 260, 263, 266, 168; 348/E9.042, 234, 30, E9.052, E5.035, 348/E9.01

See application file for complete search history.

(56) References Cited

U.S. PATENT DOCUMENTS

| | | | |
|---|---|---|---|
| 6,507,372 B1 * | 1/2003 | Kim | 348/630 |
| 7,447,374 B1 * | 11/2008 | Reid | 382/254 |
| 7,916,963 B2 * | 3/2011 | Reid | 382/254 |
| 8,326,072 B2 * | 12/2012 | Someya et al. | 382/260 |
| 8,525,900 B2 * | 9/2013 | Garten | 348/229.1 |
| 8,570,396 B2 * | 10/2013 | Rapaport | 348/229.1 |
| 2007/0183660 A1 * | 8/2007 | Park et al. | 382/168 |
| 2009/0022417 A1 * | 1/2009 | Reid | 382/274 |
| 2011/0299773 A1 * | 12/2011 | Monobe et al. | 382/167 |
| 2013/0114853 A1 * | 5/2013 | Sengupta et al. | 382/103 |

FOREIGN PATENT DOCUMENTS

| | | |
|---|---|---|
| JP | 2003-132358 | 5/2003 |
| KR | 1020080105474 A | 4/2008 |
| KR | 1020080066485 A | 7/2008 |

* cited by examiner

*Primary Examiner* — Mekonen Bekele
(74) *Attorney, Agent, or Firm* — Lowe Hauptman & Ham, LLP

(57) ABSTRACT

There are provided an apparatus and a method for estimating edge areas of pixels in a digital image to thereby prevent an edge sharpening algorithm from being applied to non-edge area of the digital image. Therefore, the apparatus can accurately determine whether each pixel is in an edge area or in a non-edge area, by generating a binary mask obtained by using a luminance difference average between each pixel and each of neighboring pixels in the digital image. Moreover, the determination of an edge-area or a non-edge area may be applied to various digital images, by adjusting a level of edge-area determination.

10 Claims, 6 Drawing Sheets

APPARATUS AND METHOD FOR ESTIMATING EDGE AREAS OF DIGITAL IMAGE

CROSS-REFERENCE TO RELATED APPLICATIONS

This application claims the priority of Korean Patent Application No. 10-2010-0076114 filed on Aug. 6, 2010, in the Korean Intellectual Property Office, the disclosure of which is incorporated herein by reference.

BACKGROUND OF THE INVENTION

1. Field of the Invention

The present invention relates to an apparatus and a method for estimating edge areas of pixels in a digital image, and more particularly, to an apparatus and a method for estimating edge areas of pixels in a digital image to thereby prevent an edge sharpening algorithm from being applied to non-edge area of the digital image.

2. Description of the Related Art

In general, the light sense of humans tends to prefer images with high-definition in recognizing images displayed on an image device. Various techniques for improving the definition of an image have been applied to an image device, such as a digital camera, a TV, and a camera-mounted mobile phone, so as to meet the preference of the light sense of humans. One of the techniques for improving image definition is to make the edge (outline) of a digital image sharper.

As for well-known edge sharpening techniques in the related art, two techniques are broadly used. One of the two techniques is based on the fact that a filtering value, generated by applying two-dimensional High Pass Filtering (2D-HPF) to the whole image, is applied to an original image. The other is based on the fact that a filtering value is applied to an original image, the filtering value being generated by applying a 2D-HPF according to characteristics (e.g., directivity) of the edge of an image.

In the case of the former, the 2D-HPF is applied to the entire image, and then the resultant image is added to an original image. However, excessive sharpening is made on the strong edge, and thus overshooting and undershooting occur, which results in a ringing phenomenon in which white border is formed within a border of an object. Also, internal noise of an image device makes shaken parts (background noise), represented on a flat area of an image, sharper, and thus the image is unnatural.

In the case of the latter, directivity (i.e., one of characteristics of an edge of an image) is identified, and then a 2D-HFP process, suitable for determining the directivity of each edge is selectively applied thereto. That is, the directivity of each edge, such as horizontal, vertical, and diagonal directions, as well as non-directivity, is identified, and then a 2D-HPF process suitable for each of the directivities is selectively applied thereto, to generate a filtering value and apply the filtering value to an input image. In the technique, the more the kind of directivities of edges, the more 2D-HDFs is required depending on various factors (type of determination equation, priority for determination's result, and directivity). Therefore, a system for performing edge sharpening becomes larger. Also, in the case of the latter, the directivity of an edge is identified, but the magnitude of the edge is not considered, so a ringing phenomenon may occur on strong edges, as in the case of the former sharpening. Also, each pixel of an image is subjected to 2D-HPF filtering depending on its directivity, and thus edge sharpening is discontinuous, which results in a reduction of definition of an image. Therefore, in the prior art, in order to improve the definition of a digital image, there is required a technique for estimating edges as a solution for solving an image of low quality by applying edge sharpening to unnecessary portions.

Therefore, in order to solve the conventional problem of a degradation in an image's quality due to unnecessary edge sharpening, there is required a technique for estimating edge areas to improve the definition of a digital image.

SUMMARY OF THE INVENTION

An aspect of the present invention provides an apparatus and a method for estimating edge areas of a digital image to thereby prevent an edge sharpening algorithm from being applied to non-edge areas.

According to an aspect of the present invention, there is provided an apparatus for estimating edge areas of a digital image including: a luminance difference average calculation unit calculating, for each one of pixels in an input image, a luminance difference average, representing an average in absolute values of luminance differences between the one of pixels and each of neighboring pixels around the one pixel; a histogram difference average histogram calculation unit generating a histogram for the calculated luminance difference average of the input image; a luminance difference average cumulative distribution calculation unit calculating a cumulative distribution of the luminance difference average from the calculated histogram for the luminance difference average; and a binary mask generation unit setting a luminance difference average having a frequency distribution of the histogram preset in a cumulative distribution of the luminance difference average to be a reference value, and generating a binary mask used for distinguishing a pixel having a luminance difference average lower than the reference value from a pixel having a luminance difference average higher than the reference value, wherein the binary mask generation unit determines that the pixel with the luminance difference average higher than the reference value is in an edge area of the input image.

The luminance difference average calculation unit may calculate, for each of the pixels, the average in the absolute values of luminance differences between the one pixel and each of neighboring pixels around the one pixel as the luminance difference average, by applying a 3 by 3 mask on a pixel-by-pixel basis, the neighboring pixels being positioned around the one pixel in the horizontal, vertical, and diagonal directions.

The binary mask generation unit may determine the preset frequency of the cumulative distribution as a preset ratio for all of the pixels in the input image.

The binary mask may be a mask which sets a pixel with a luminance difference average lower than the reference value to have a white color, and sets a pixel with a luminance difference average larger than the reference value to have a black color.

The apparatus may further include a binary mask complementing unit which determines, for each one of pixels in the binary mask, continuity between the one of pixels and pixels adjacent to the one pixel, and changes a distinction of the pixel set by the binary mask generation unit.

According to another aspect of the present invention, there is provided a method for estimating edge areas in a digital image including: calculating, for each one of pixels in an input image, a luminance difference average, representing an average in absolute values of luminance differences between the one of pixels and each of neighboring pixels around the one pixel; generating a histogram for the calculated luminance difference average of the input image; calculating a cumulative distribution of the luminance difference average from the calculated histogram for the luminance difference average; and setting a luminance difference average having a frequency distribution of the histogram preset in a cumulative distribution of the luminance difference average to be a reference value, and generating a binary mask used for distinguishing a pixel having a luminance difference average lower than the reference value from a pixel having a luminance difference average higher than the reference value, wherein the generating of the binary mask comprises determining that the pixel with the luminance difference average higher than the reference value is in an edge area of the input image.

The calculating of the luminance difference average may include calculating, for each of the pixels, the average in the absolute values of luminance differences between the one pixel and each of neighboring pixels around the one pixel as the luminance difference average, by applying a 3 by 3 mask on a pixel-by-pixel basis, the neighboring pixels being positioned around the one pixel in the horizontal, vertical, and diagonal directions.

The generating of the binary mask may include determining the preset frequency of the cumulative distribution as a preset ratio for all of the pixels in the input image.

The binary mask may be a mask which sets a pixel with a luminance difference average lower than the reference value to have a white color, and sets a pixel with a luminance difference average higher than the reference value to have a black color.

The method may further include, for each one of pixels in the binary mask, continuity between the one of pixels and pixels adjacent to the one pixel, and changing a distinction of the pixel set by the binary mask generation unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figures 1, 2:
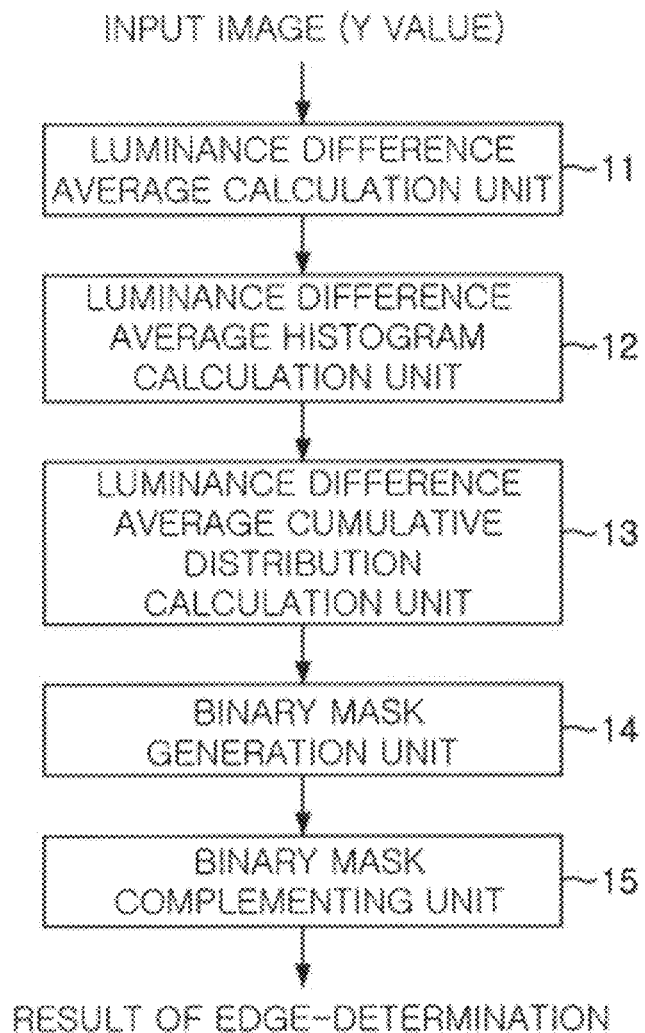
FIG. 1 is a block diagram showing an apparatus for estimating edge areas of a digital image according to an embodiment of the present invention.
FIG. 2 is a view showing an example where a 3×3 mask is applied to each pixel by luminance difference average calculation unit of the apparatus for estimating edges in a digital image.

Exemplary embodiments of the present invention will now be described in detail with reference to the accompanying drawings. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals are used to designate the same or similar components throughout.

FIG. 1 is a block diagram showing an apparatus for estimating edge areas of a digital image according to an embodiment of the present invention.

As shown in FIG. 1, the apparatus for estimating edge areas of a digital image according to the embodiment of the present invention may include a luminance difference average calculation unit 11, a luminance difference average histogram calculation unit 12, a luminance difference average cumulative distribution calculation unit 13, and a binary mask generation unit 14. In addition to this, the apparatus for estimating the edge areas of the digital image according to the embodiment of the present invention may further include a binary mask complementing unit 15.

The luminance difference average calculation unit 11 may calculate a luminance difference average, representing an average of absolute values in luminance differences between each pixel and each of neighboring pixels around the pixel of the input image. Information on the image inputted to the luminance difference average calculation unit 11 may be a luminance value (Y) of the input image. In the embodiment of the present invention, the luminance difference average calculation unit 11 may apply a 3×3 mask to each of pixels in the input image, thereby calculating an average of absolute values in luminance differences between each pixel and each of neighboring pixels around the pixel of the input image. At this time, the 3×3 mask has three columns and three rows centering on each pixel.

The luminance difference average histogram calculation unit 12 may generate a histogram for the luminance difference average of the input image, and the luminance difference average cumulative distribution calculation unit 13 may calculate a cumulative distribution for the luminance difference average by using the histogram for the luminance difference average.

The binary mask generation unit 14 may set the luminance difference average which has a cumulative frequency preset in the cumulative distribution of the luminance difference average to be a to reference value. The binary mask generation unit 14 may generate a binary mask which distinguishes a pixel having a luminance difference average lower than the reference value from a pixel having a luminance difference average higher than the reference value. The binary mask generation unit 14 may determine the preset cumulative frequency as a preset ratio for all pixels of the input image. Also, the binary mask generated by the binary mask generation unit 14 may be a mask which sets a pixel with a luminance difference average lower than the reference value to have a white color, and sets a pixel with a luminance difference average larger than the reference value to have a black color.

The binary mask complementing unit 15, which may be an additional construction in the embodiment of the present invention, may determine whether continuity exists between each pixel and neighboring pixels around the pixel of the binary mask, and according to the result of the determination, change a distinction of set pixels.

Hereinafter, a detailed description will be given of operating and operational effects of the apparatus for estimating the edge areas of a digital image according to the embodiment of the present invention, with reference to the accompanying drawings.

First, when the apparatus for estimating the edge areas of the digital image receives information on luminance values for the input image, the luminance difference average calculation unit 11 may calculate a luminance difference average for each of the pixels in the input image by using the received information on luminance values. The luminance difference average of a corresponding pixel may be obtained by calculating absolute values in luminance differences for one pixel and each of neighboring pixels around the one pixel of the input image, and calculating the average in the calculated absolute values.

FIG. 2 is a view showing an example where a 3×3 mask is applied to each pixel by a luminance difference average calculation unit of the apparatus for estimating edge areas in a digital image. The luminance difference average calculation unit 11 applies a 3×3 mask, shown in FIG. 2, to each of the pixels. Referring to FIG. 2, a target pixel is a central pixel P22, and neighboring pixels are 8 pixels of P11, P12, P13, P21, P31, P32, and P33 around the central pixel P22. The neighboring pixels are positioned centering on the central pixel P22 in the horizontal, vertical, and diagonal directions. An average in absolute values of the luminance differences between a target pixel and each of the neighboring pixels around the target pixel may be a luminance difference average of the target pixel. For example, when the mask shown in FIG. 2 is used, a luminance difference average of the central pixel P22 may be calculated as defined by equation (1) below.

$$ASAD = \frac{\sum |Ymm - Y22|}{8} \quad (1)$$

In equation (1), ASAD denotes a luminance difference average, m has values of 1, 2, and 3, and n has values of 1, 2 and 3.

Figure 3A:
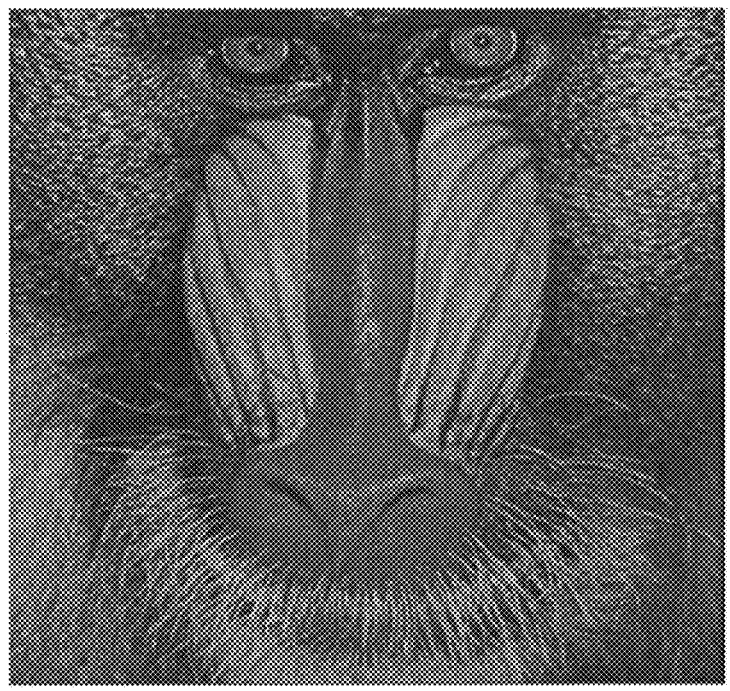
FIGS. 3A and 3B are views showing a comparison between an original input image and a new input image obtained by replacing each pixel with a luminance difference average, respectively.
Figure 3B:
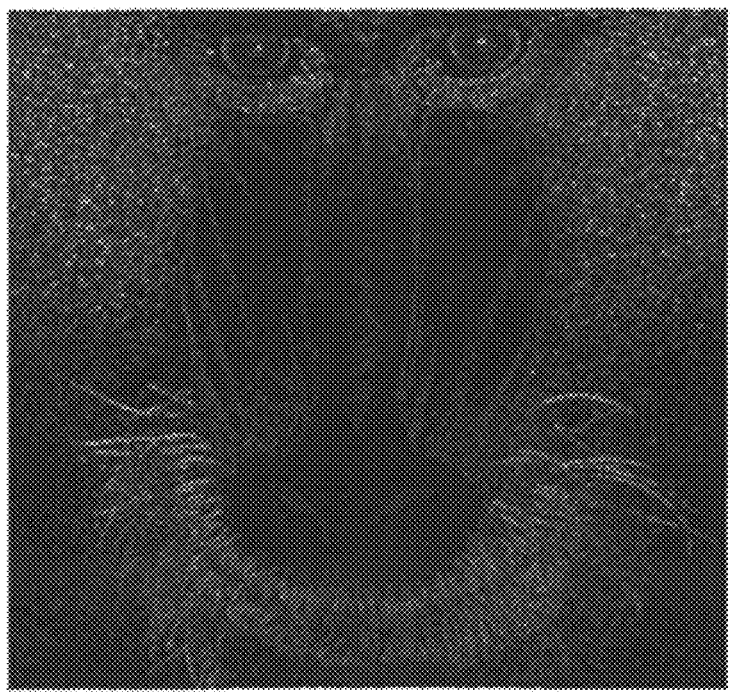

FIGS. 3A and 3B are views showing a comparison between an input image and an image obtained by replacing each pixel with a luminance difference average, respectively.

The image shown in FIG. 3B may be obtained by calculating a luminance difference average for the input image shown in FIG. 3A, by the luminance difference average calculation unit 11, and replacing each of the pixels in the input image with the calculated luminance difference average. That is, as in FIG. 3B, since the luminance difference average is increased according to an increase of the luminance differences, an image with high luminance is represented on a part with a large luminance difference like an edge, whereas an image with low luminance is represented on a part with a small luminance difference.

Then, the luminance difference average histogram calculation unit 12 generates a histogram for the luminance difference average for the input image.

Figure 4A:
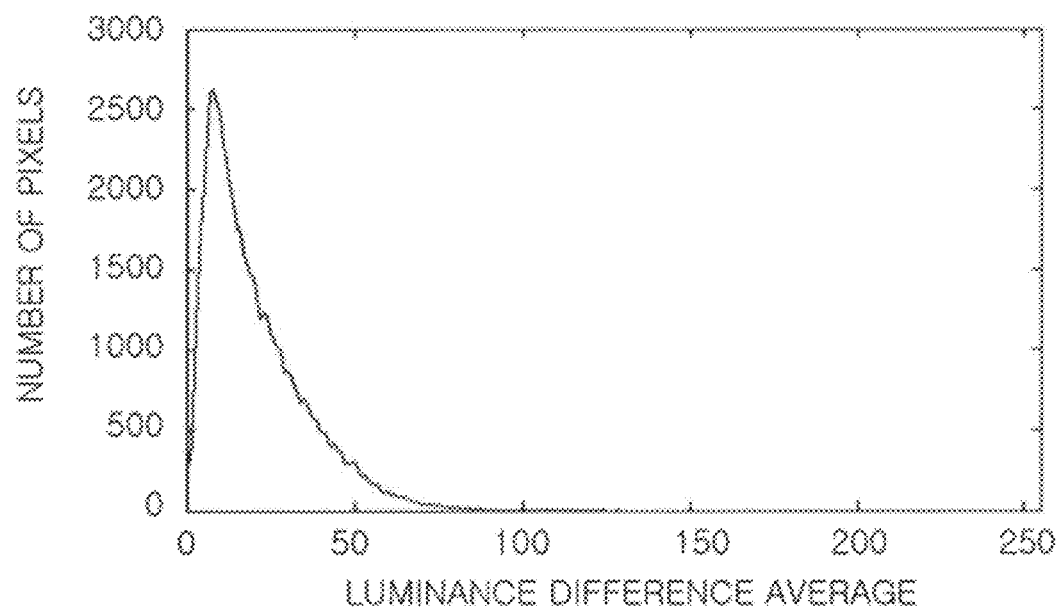
FIG. 4A is a view showing an example of a histogram of the input image for the luminance difference average generated by the luminance difference average histogram calculation unit according to an embodiment of the present invention.

FIG. 4A shows an example of a histogram for the input image with respect to the luminance difference average. As in FIG. 4A, the histogram of the input image with respect to the luminance difference average has an x axis which represents a luminance difference average, and an y axis which represents the number of pixels with a corresponding luminance difference average.

Then, the luminance difference average cumulative distribution calculation unit 13 may calculate the cumulative distribution of the luminance difference average from the histogram for the luminance difference average.

Figure 4B:
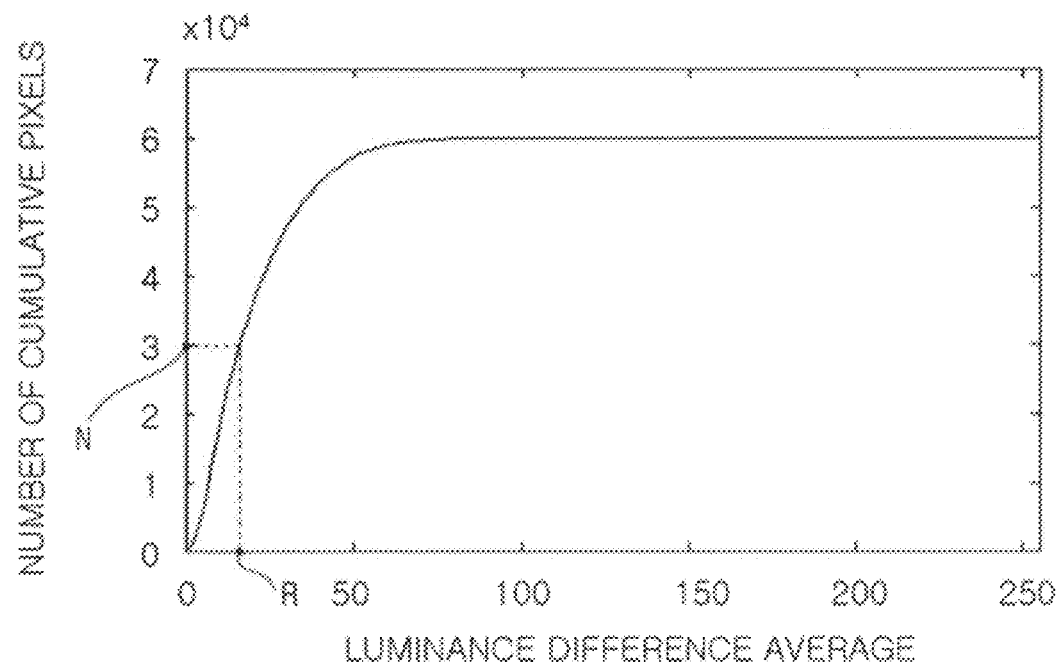
FIG. 4B is a view showing an example of a cumulative distribution of the calculated luminance difference average obtained by the histogram of the input image for the luminance difference average shown in FIG. 4A.

FIG. 4B shows a histogram of cumulative distribution of the luminance difference average which is calculated by the histogram of the input image for the luminance difference average. As shown in FIG. 4B, in the histogram of cumulative distribution of the luminance difference average, the x axis denotes a luminance difference average, and the y axis denotes a sum of the number of pixels (i.e., the number of cumulative pixels) with a luminance difference average less than a corresponding luminance difference average. In FIG. 4B, the number of the cumulative pixels on the y axis corresponding to a maximum value of the luminance difference average on the x axis becomes the number of all of the pixels in the input image.

Then, the binary mask generation unit 14 sets the luminance difference average with the preset frequency of the cumulative distribution in the cumulative distribution of the luminance difference average to be a reference value. Then, the binary mask generation unit 14 generates a binary mask used for distinguishing a pixel having a luminance difference average lower than the reference value from a pixel having a luminance difference average higher than the reference value. The binary mask generation unit 14 may determine the frequency of the cumulative distribution which is used to set the luminance difference average to be the reference value, as a preset ratio for all of the pixels of the input image.

For example, as shown in FIG. 4B, if it is assumed that a preset ratio for an image with only six pixels is a value of 0.5 (50%), the number of cumulative pixels for determination of the reference value becomes three alone (indicated by reference numeral 'N' in FIG. 4B), and a luminance difference average ('R') corresponding to the number of three cumulative pixels alone becomes the reference value. Thus, the binary mask generation unit 14 recognizes pixels with a luminance difference average less than the reference value ('R') as non-edge areas, and determines that a luminance difference is low, and thus sets the edges to have a white color. The binary mask generation unit 14 recognizes pixels with a luminance difference average higher than the reference value ('R') as edge areas, and sets the pixels to have a black color.

Figure 5:
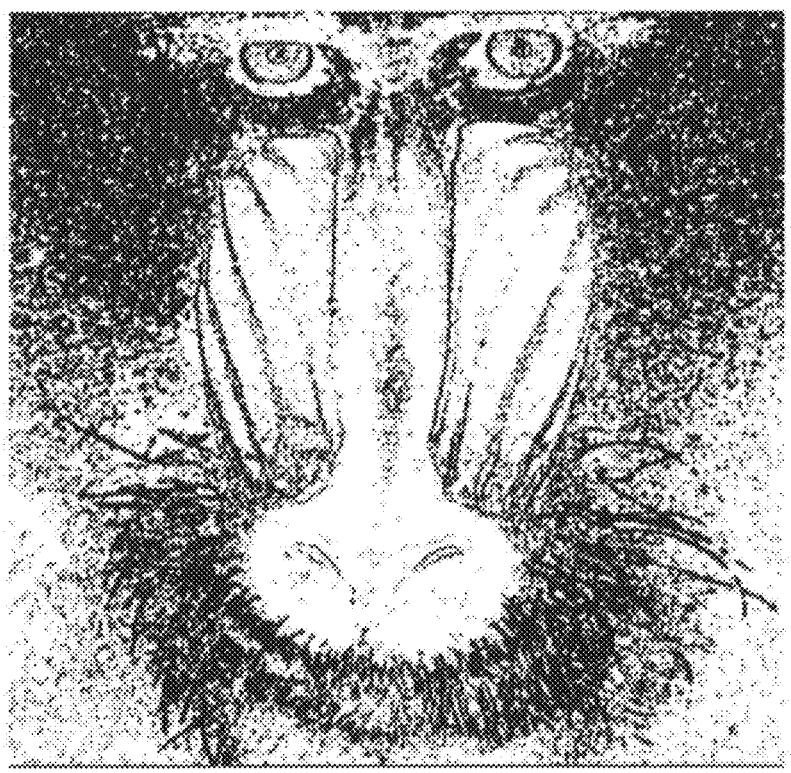
FIG. 5 is a view showing a binary image generated by a binary mask generation unit according to the embodiment of the present invention.

FIG. 5 is a view showing a binary image generated by a binary mask generation unit according to the embodiment of the present invention. As shown in FIG. 5, according to the embodiment of the present invention, it is possible to generate a binary image to determine whether a pixel is in an edge area or in a non-edge area. In particular, according to the embodiment of the present invention, it is possible to optimize the determination of an edge area or non-edge area by adjusting a ratio for the number of pixels set to determine the reference value.

Then, when some edge areas are made sharper than others in the binary mask generated by the binary mask generation unit 14, the sharp edge areas are removed because they may roughly and unnaturally generate an image. Thereafter, the binary mask complementing unit 15 may be used to generate natural images with continuity between adjacent pixels. The binary mask complementing unit 15 determines continuity between each pixel and each of neighboring pixels around the pixel of the binary mask, and according to the result of the determination, change the distinction of pixels set by the binary mask generation unit.

FIGS. 6A to 6D are views showing examples where a binary mask complementing unit determines continuity between each pixel and each of neighboring pixels according to the embodiment of the present invention, respectively. As shown in FIGS. 6A to 6D, there may be used a 3×5 mask to minimize the use of a line memory and greatly use information in the binary mask.

Figure 6A:
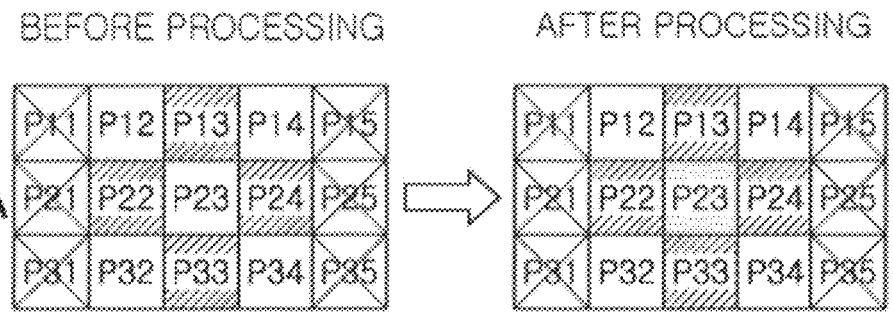
FIGS. 6A to 6D are views showing examples where a binary mask complementing unit determines continuity for pixels according to the embodiment of the present invention, respectively.

As shown in FIG. 6A, before being processed by the binary mask complementing unit 15, the central pixel P23 surrounded by neighboring pixels (P13, P22, P24, and P33) of edge areas may be changed to be an edge-area pixel so as to be identical to the pixels adjacent to the central pixel P23, by the binary mask complementing unit 15.

Figure 6B:
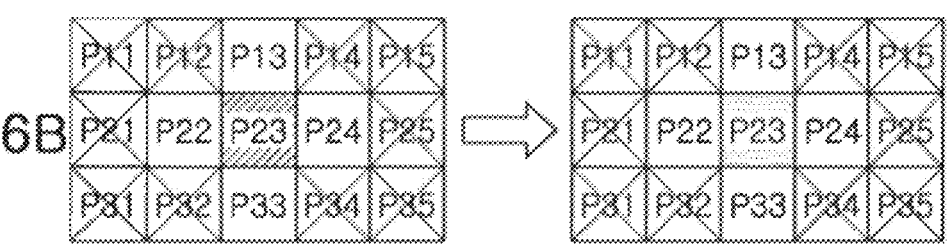

As shown in FIG. 6B, before being processed by the binary mask complementing unit 15, the central pixel P23 surrounded by neighboring pixels (P13, P22, P24, and P33) of non-edge areas may be changed into a non-edge area pixel to be identical to the pixels adjacent to the central pixel 23, by the binary mask complementing unit 15.

Figure 6C:
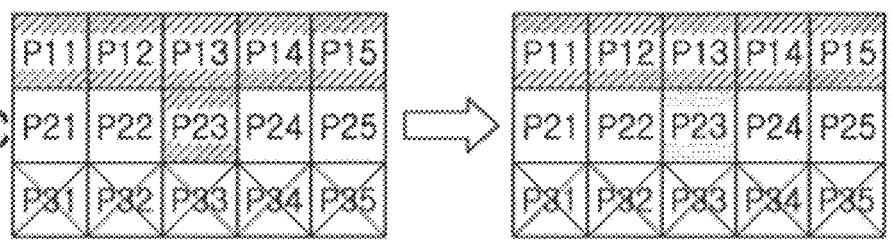

Also, as shown in FIG. 6C, before being processed by the binary mask complementing unit 15, the edge-area central pixel P23 surrounded by neighboring pixels (P11, P12, P13, P14, and P15) of edge areas in an upper row and by neighboring pixels (P21, P22, P24, and P25) of non-edge areas in the same row as the central pixel 23 may be changed into a non-edge area pixel in order to maintain continuity of edge-area pixels in the upper row, by the binary mask complementing unit 15.

Figure 6D:
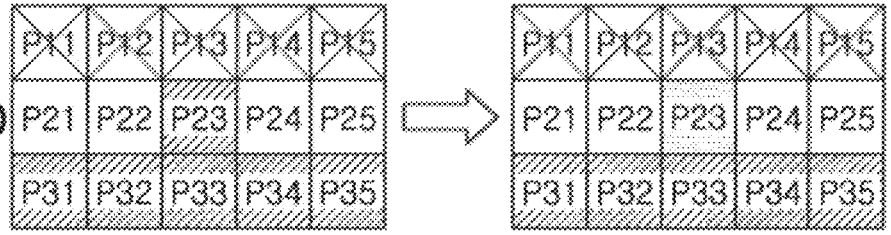

Also, as shown in FIG. 6D, before being processed by the binary mask complementing unit 15, the edge area central pixel P23 surrounded by neighboring pixels (P31, P32, P33, P34, and P35) of edge areas in an lower row and by neighboring pixels (P21, P22, P24, and P25) of non-edge areas in the same row as the central pixel 23 may be changed into a non-edge area pixel, in order to maintain continuity of edge-area pixels in the low row.

Figure 7:
FIG. 7 is a view showing an image obtained by the binary mask complementing unit according to the embodiment of the present invention.

FIG. 7 is a view showing an image obtained by the binary mask complementing unit according to the embodiment of the present invention. According to a comparison between FIGS. 5 and 7, it can be seen that a binary image obtained by the binary mask complementing unit has no single edge and has improved continuity.

As described above, an apparatus for estimating edge areas of a digital image according to the embodiment of the present invention can accurately determine whether each pixel is in an edge area or in a non-edge area, by generating a binary mask obtained by using a luminance difference average between each pixel and each of neighboring pixels in the digital image. Moreover, the determination of an edge-area or a non-edge area may be applied to various digital images, by adjusting a level of edge-area determination.

Also, it is possible to change the edge areas in consideration of continuity between edge-area pixels, thereby implementing a smooth and natural image.

According to the embodiment of the present invention, a binary mask is generated by using a luminance difference average between each pixel and each of neighboring pixels in a digital image, so that it is possible to accurately determine whether each pixel is in an edge area or in a non-edge area.

Also, the determination of an edge-area or a non-edge area may be applied to various digital images, by adjusting a level of edge-area determination.

Also, it is possible to perform an edge sharpening more naturally, by adjusting edge areas in consideration of continuity of the image.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for estimating edge areas of a digital image comprising:
a luminance difference average calculation unit calculating, for each one of pixels in an input image, a luminance difference average, representing an average in absolute values of luminance differences between the one of pixels and each of neighboring pixels around the one pixel;
a histogram difference average histogram calculation unit generating a histogram for the calculated luminance difference average of the input image;
a luminance difference average cumulative distribution calculation unit calculating a cumulative distribution of the luminance difference average from the calculated histogram for the luminance difference average; and
a binary mask generation unit setting a luminance difference average having a frequency distribution of the histogram preset in a cumulative distribution of the luminance difference average to be a reference value, and generating a binary mask used for distinguishing a pixel having a luminance difference average lower than the reference value from a pixel having a luminance difference average higher than the reference value,
wherein the binary mask generation unit determines that the pixel with the luminance difference average higher than the reference value is in an edge area of the input image.

2. The apparatus of claim 1, wherein the luminance difference average calculation unit calculates, for each of the pixels, the average in the absolute values of luminance differences between the one pixel and each of neighboring pixels around the one pixel as the luminance difference average, by applying a 3 by 3 mask on a pixel-by-pixel basis, the neighboring pixels being positioned around the one pixel in the horizontal, vertical, and diagonal directions.

3. The apparatus of claim 1, wherein the binary mask generation unit determines the preset frequency of the cumulative distribution as a preset ratio for all of the pixels in the input image.

4. The apparatus of claim 1, wherein the binary mask is a mask which sets a pixel with a luminance difference average lower than the reference value to have a white color, and sets a pixel with a luminance difference average larger than the reference value to have a black color.

5. The apparatus of claim 1, further comprising a binary mask complementing unit which determines, for each one of pixels in the binary mask, continuity between the one of pixels and pixels adjacent to the one pixel, and changes a distinction of the pixel set by the binary mask generation unit.

6. A method for estimating edge areas in a digital image comprising:
calculating, for each one of pixels in an input image, a luminance difference average, representing an average in absolute values of luminance differences between the one of pixels and each of neighboring pixels around the one pixel;
generating a histogram for the calculated luminance difference average of the input image;

calculating a cumulative distribution of the luminance difference average from the calculated histogram for the luminance difference average; and setting a luminance difference average having a frequency distribution of the histogram preset in a cumulative distribution of the luminance difference average to be a reference value, and generating a binary mask used for distinguishing a pixel having a luminance difference average lower than the reference value from a pixel having a luminance difference average higher than the reference value, wherein the generating of the binary mask comprises determining that the pixel with the luminance difference average higher than the reference value is in an edge area of the input image.

7. The method of claim 6, wherein the calculating of the luminance difference average comprises calculating, for each of the pixels, the average in the absolute values of luminance differences between the one pixel and each of neighboring pixels around the one pixel as the luminance difference average, by applying a 3 by 3 mask on a pixel-by-pixel basis, the neighboring pixels being positioned around the one pixel in the horizontal, vertical, and diagonal directions.

8. The method of claim 6, wherein the generating of the binary mask comprises determining the preset frequency of the cumulative distribution as a preset ratio for all of the pixels in the input image.

9. The method of claim 6, wherein the binary mask is a mask which sets a pixel with a luminance difference average lower than the reference value to have a white color, and sets a pixel with a luminance difference average higher than the reference value to have a black color.

10. The method of claim 6, further comprising determining, for each one of pixels in the binary mask, continuity between the one of pixels and pixels adjacent to the one pixel, and changing a distinction of the pixel set by the binary mask generation unit.

* * * * *